US007565323B2

(12) United States Patent
Hughes et al.

(10) Patent No.: US 7,565,323 B2
(45) Date of Patent: Jul. 21, 2009

(54) HARDWARE ID TO PREVENT SOFTWARE PIRACY

(75) Inventors: Aidan T. Hughes, Bellevue, WA (US); David Barnaby Pearce, West Palm Beach, FL (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/668,580

(22) Filed: Sep. 23, 2003

(65) Prior Publication Data

US 2004/0059938 A1  Mar. 25, 2004

Related U.S. Application Data

(60) Division of application No. 09/859,915, filed on May 17, 2001, now Pat. No. 7,503,072, which is a continuation-in-part of application No. 09/070,518, filed on Apr. 29, 1998, now Pat. No. 6,243,468.

(51) Int. Cl.
*G06Q 99/00* (2006.01)
(52) U.S. Cl. ............................ 705/50; 710/10; 711/117; 700/79; 365/201
(58) Field of Classification Search ................. 719/323; 710/10, 307; 365/201; 700/79; 711/117; 379/56, 56.1; 705/53, 56, 51; 717/175; 726/4

See application file for complete search history.

(56) References Cited

U.S. PATENT DOCUMENTS

| 4,658,093 | A | | 4/1987 | Hellman | 380/25 |
|---|---|---|---|---|---|
| 4,688,169 | A | | 8/1987 | Joshi | 364/200 |
| 4,796,220 | A | | 1/1989 | Wolfe | 364/900 |
| 4,866,769 | A | * | 9/1989 | Karp | 705/56 |
| 5,199,066 | A | | 3/1993 | Logan | 380/4 |
| 5,357,573 | A | | 10/1994 | Walters | 380/25 |

(Continued)

FOREIGN PATENT DOCUMENTS

EP       0844549 A1    5/1998

(Continued)

OTHER PUBLICATIONS

Jansson, Peter; Patterning CD-ROM;Jul. 1987; PC Tech Journal; vol. 5, No. 7, p. 162(11).*

(Continued)

*Primary Examiner*—James P Trammell
*Assistant Examiner*—Behrang Badii
(74) *Attorney, Agent, or Firm*—Merchant & Gould, P.C.

(57) ABSTRACT

In one embodiment, the invention is a 64 bit hardware ID (H/W ID) for tying a software product to a particular computer to prevent software piracy. The 64 bit hardware ID represents ten different components of the user's computer: the CD-ROM device, the disk adapter, the disk device, the display adapter, the first drive serial number, the MAC address, the processor serial number, the processor type, the RAM size in Mb, and the SCSI adapter. Each time the software product is opened, the expanded H/W ID is compared to the hardware on the computer to determine whether a predetermined minimum number of components match. In one embodiment, the expanded H/W ID allows for expansion of the user's computer because so long as the component originally listed in the expanded H/W ID can be found on the computer, then that component matches the expanded H/W ID. Typically, seven out of ten components in the expanded HIW ID must match the computer before the software product will fully operate.

10 Claims, 6 Drawing Sheets

U.S. PATENT DOCUMENTS

| | | | |
|---|---|---|---|
| 5,379,343 A | 1/1995 | Grube et al. ............... 380/4 |
| 5,490,216 A | 2/1996 | Richardson, III ............... 380/4 |
| 5,491,804 A | 2/1996 | Heath et al. ............... 395/275 |
| 5,491,813 A * | 2/1996 | Bondy et al. ............... 719/323 |
| 5,502,831 A | 3/1996 | Grube et al. ............... 395/427 |
| 5,509,070 A | 4/1996 | Schull ............... 380/4 |
| 5,646,992 A * | 7/1997 | Subler et al. ............... 705/53 |
| 5,666,411 A | 9/1997 | McCarty ............... 380/4 |
| 5,671,412 A | 9/1997 | Christiano et al. ............... 395/615 |
| 5,754,864 A | 5/1998 | Hill ............... 395/712 |
| 5,757,907 A | 5/1998 | Cooper et al. ............... 380/4 |
| 5,761,649 A | 6/1998 | Hill ............... 705/27 |
| 5,790,664 A | 8/1998 | Coley et al. ............... 380/4 |
| 5,835,911 A | 11/1998 | Nakagawa et al. ............... 707/203 |
| 5,867,730 A * | 2/1999 | Leyda ............... 710/10 |
| 5,892,900 A | 4/1999 | Ginter et al. ............... 395/186 |
| 5,940,504 A | 8/1999 | Griswold ............... 380/4 |
| 5,968,175 A | 10/1999 | Morishita et al. ............... 713/200 |
| 5,995,424 A * | 11/1999 | Lawrence et al. ............... 365/201 |
| 6,041,411 A | 3/2000 | Wyatt ............... 713/200 |
| 6,044,471 A | 3/2000 | Colvin ............... 713/202 |
| 6,081,752 A * | 6/2000 | Benson et al. ............... 700/79 |
| 6,085,324 A | 7/2000 | Ogram et al. ............... 713/202 |
| 6,240,401 B1 | 5/2001 | Oren et al. ............... 705/40 |
| 6,243,468 B1 | 6/2001 | Pearce et al. ............... 380/255 |
| 6,244,758 B1 | 6/2001 | Solymar et al. ............... 395/200.54 |
| 6,449,645 B1 | 9/2002 | Nash ............... 709/224 |
| 6,480,925 B1 * | 11/2002 | Bodo ............... 710/307 |
| 6,845,428 B1 * | 1/2005 | Kedem ............... 711/117 |
| 2002/0106060 A1 * | 8/2002 | Dapper et al. ............... 379/56.1 |

OTHER PUBLICATIONS

Silent safeguard—An anti-piracy device lets you hear the bands without the blips; B. Fox; *New Scientist*, (Aug. 21, 1999) v.163, n. 2200, p. 12.

Rallying the disc patrol: protection schemes for CD and DVD; D. Galante Block; *EMedia Professional*, (Dec. 1998) v. 11, n. 12 p. 34-8, 40-3.

Anti-counterfeiting holograms and government anti-piracy activities in China; Hsu Dahsiung; *Proceedings of the SPIE—The International Society for Optical Engineering Conference*, (1998) v. 3358, p. 318-321.

CD/DVD piracy: the replicator, the user and the technology; D.G. Block; *EMedia Professional*, (Dec. 1997) v.10, n.12, p. 92-96, 98-100, 102-104, 106-107.

Preventive and deterrent controls for software piracy; R.D. Gopal and G.L. Sanders; *Journal of Management Information Systems* (Spring 1997) v.13, n.4, p. 29-47.

Foiling corporate software pirates; D.H. Freedman; *High Technology* (Jul. 1995) v.5 n.7, p. 62-64.

Software piracy: stopping it before it stops you; Mark B. Johnson; *Proceedings of the Sixteenth ACM SIGUCCS Conference on User Services*, 1988, p. 295-299.

Software watermarking: models and dynamic embeddings; Christian Colberg and Clark Thomborson; *Proceedings of the 26th ACM SIGPLAN-SIGACT Symposium on Principles of Programming Languages*, 1999, p. 311-324.

How to prove where you are: tracking the location of customer equipment; Eran Gabber and Avishai Wool; *Proceedings of the 5th ACM conference on Computer and Communications Security*, 1998, p. 142-149.

Handling site-licensing agreements and public domain software architecture; John D. Chovan; *Proceedings of the ACM SIGUCCS XIII Conference on User Services: pulling it all together*, 1985, p. 175-179.

Digital signets: self-enforcing protection of digital information (preliminary version); Cynthia Dwork, Jeffrey Lotspieh and Moni Naor; *Proceedings of the Twenty-eighth Annual ACM Symposium on Theory of Computing*, 1996, p. 489-498.

* cited by examiner

HARDWARE ID TO PREVENT SOFTWARE PIRACY

REFERENCE TO RELATED APPLICATIONS

This application is a divisional of application Ser. No. 09/859,915, filed May 17, 2001, now U.S. Pat. No. 7,503,072 which is a continuation-in-part of U.S. patent application Ser. No. 09/070,518, entitled "SOFTWARE ANTI-PIRACY SYSTEM THAT ADAPTS TO HARDWARE UPGRADES", filed Apr. 29, 1998, now U.S. Pat. No. 6,243,468 which is incorporated by reference herein.

TECHNICAL FIELD

The invention generally relates to systems and methods for preventing piracy or illicit use of software by identifying hardware components of a computer. More particularly, this invention relates to such systems and methods that allow hardware components of the underlying computer to be upgraded and the software to be legitimately installed on the upgraded machine without triggering the anti-piracy protection.

BACKGROUND

Computer software is a unique consumer product in that the same product can be replicated many times after being sold. Once a software product is sold, typically as software code on a computer-readable disk, the purchaser can easily copy the code to other computer-readable media thereby replicating the same product many times over.

This characteristic of software can be a tremendous benefit in terms of lowering manufacturing costs and facilitating distribution. For instance, easy replication allows a software manufacturer to distribute one physical copy of the software product and sell a multi-seat license that legally empowers the purchaser to install the software product on many different computers.

Unfortunately, this benefit comes at a cost of open abuse. One well-known abuse is piracy. An unscrupulous party can obtain a copy of the object code (legally or illegally) and then illicitly replicate and resell pirated copies of the product. Software companies attempt to monitor piracy activities, but detection is often difficult. Moreover, even when improper activity is detected, enforcement and legal recourse is often unavailable from a practical standpoint, particularly since much of the abuse occurs in foreign lands.

A less subtle abuse is the improper use of a software product beyond the scope of the license. One common scenario involves a shrink-wrap software product available at local retail stores. The product is typically accompanied by a shrink-wrap license to install and use the product on one computer, and perhaps additionally on a laptop. Unfortunately, the purchaser may intentionally or unintentionally install the product on more than the allowed computers, thereby violating the license. For the software manufacturer, this form of abuse is very difficult to monitor and even more difficult to prosecute.

The computer software industry estimates billions of dollars are lost each year due to piracy and other illicit uses. While licenses provide a legal avenue for recourse against such practices, the practicality of detecting and enforcing these licenses often proves too onerous for the manufacturer. Accordingly, software companies have a real incentive to reduce the amount of abuses through other means.

One conventional technique for preventing unlimited copying of a software product is to design the code with a self-regulating mechanism that prevents repeated installations. This mechanism counts the number of installations and disables the software code after the product has been installed a certain number of times. The underlying premise is that multiple installations tend to indicate that the user is attempting to install the product on multiple different computers, rather than just one computer allowed by the license.

As an example of this concept, suppose a manufacturer creates a software product and places the code on a disk, such as a CD-ROM or floppy diskette. The disk is packaged to form a shrink-wrap retail product. The manufacturer generates and assigns a serialized key that uniquely identifies that product. For instance, the key might consist of a manufacturer ID, a serialized incrementing number, a registered product code, and a checksum value. The key is printed on a label and affixed somewhere on the product, such as the CD-ROM case.

During installation, the purchaser of the software product is prompted to enter the key. This step alone is designed to prevent another party from obtaining the disk only, without knowledge of the key, and installing the product illegally. Without the key, the holder of the physical disk is prevented from installing the product.

The product tracks the number of installations. Once the purchaser enters the same key more times than a defined limit, the product is disabled. The purchaser is then forced to call the manufacturer for assistance.

While such mechanisms help reduce illicit copying, they often cause other problems in the form of consumer inconvenience. For instance, the premise that more installations than a requisite number means illegal use may be wrong in some cases. A user who has upgraded his/her computer, for example, should be able to legitimately reinstall the software product on the upgraded machine. However, if the requisite number of installations has already been reached, the product will not install, forcing the user (who is now disgruntled) to call the manufacturer for assistance.

Accordingly, there remains a need for improved technology solutions to piracy and illicit use, while recognizing and accommodating the needs and practices of a legitimate purchaser.

SUMMARY OF THE INVENTION

The present invention meets the above-described needs by providing a system for enabling enforcement of written software licensing terms for a software product for use with a computer having a set of hardware components.

In one aspect, the system includes a software product resident on a computer, the software product having an associated product ID. The software product generates a hardware ID that identifies the set of hardware components on the computer. In one embodiment, a 64-bit hardware ID that identifies a set of ten hardware components within the computer is derived. The 64 bit hardware ID represents ten different components of the user's computer: the CD-ROM device, the disk adapter, the disk device, the display adapter, the first drive serial number, the MAC address, the processor serial number, the processor type, the RAM size in Mb, and the SCSI adapter. Each time the software product is opened, the expanded H/W ID is compared to the hardware on the computer to determine whether a predetermined minimum number of components match. In one embodiment, the expanded H/W ID allows for expansion of the user's computer because so long as the component originally listed in the expanded H/W ID can be found on the computer, then that component matches the expanded H/W ID. Typically, seven out of ten components in the expanded H/W ID must match the computer before the software product will operate.

In another aspect of the invention, the software product is subsequently launched following installation and the software product retrieves the 64-bit hardware ID. The hardware ID is compared to the set of hardware components on the computer on which the software product is installed. If a suitable match occurs, the software product is enabled to operate on the computer. Otherwise, if a suitable match does not occur, the software product is locked and prevented from operating on the computer. Typically, a suitable match is found when at least seven out of ten components identified by the hardware ID are found in the set of hardware components on the current computer. Thus, the invention prevents a user from installing the software product onto multiple different computers because it uses the hardware ID to identify a specific computer.

That the invention improves over the drawbacks of prior art and accomplishes the advantages described above will become apparent from the following detailed description of the exemplary embodiments and the appended drawings and claims.

DETAILED DESCRIPTION OF EMBODIMENTS OF THE INVENTION

An embodiment of the present invention will be incorporated into the "OFFICE 10" suite of program modules marketed by Microsoft Corporation of Redmond, Wash. Briefly described, in one embodiment, the invention is an expanded 64 bit hardware ID (H/W ID) for tying a software product to a particular computer to prevent software piracy. The 64 bit hardware ID represents ten different components of the user's computer: the CD-ROM device, the disk adapter, the disk device, the display adapter, the first drive serial number, the MAC address, the processor serial number, the processor type, the RAM size in Mb, and the SCSI adapter. Each time the software product is opened, the expanded H/W ID is compared to the hardware on the computer to determine whether a predetermined minimum number of components match. In one embodiment, the expanded H/W ID allows for expansion of the user's computer because so long as the component originally listed in the expanded H/W ID can be found on the computer, then that component matches the expanded H/W ID. Typically, seven out of ten components in the expanded H/W ID must match the computer before the software product will operate.

Figure 2:
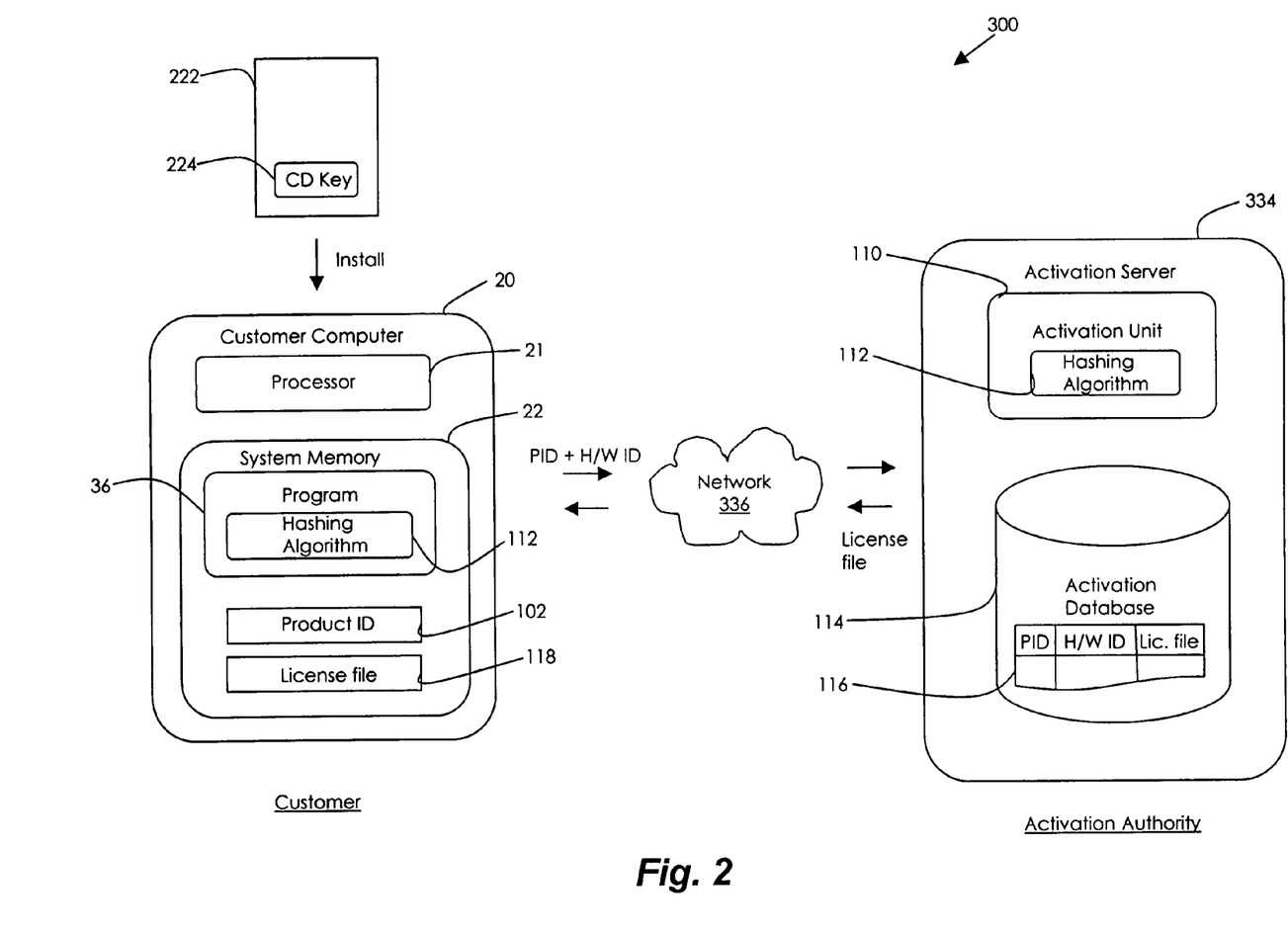
FIG. 2 is a block diagram of an anti-piracy system that facilitates activation of a software product for installation and use on a particular computer.

FIG. 2 shows an anti-piracy system 300 that facilitates activation of a software product with an activation authority for installation and use on a particular computer. The system 300 includes a customer computer 20 and an activation server 334, which resides at the activation authority remote from the customer. The customer computer 20 and activation server 334 are interconnected by a network 336 to provide data communication. In the absence of a customer computer's access to a network, the manufacturer or trusted third party may provide proxy access to the activation server by other means, such as electronic mail, fax machine, postal mail, or telephone.

For discussion purposes, the customer computer is described as a personal computer, such as a desktop or portable computer. However, as used herein, the term "computer" is intended to mean essentially any type of computing device or machine that is capable of running a software product, including such devices as communication devices (e.g., pagers, telephones, electronic books, electronic magazines and newspapers, etc.) and personal and home consumer devices (e.g., handheld computers, Web-enabled televisions, home automation systems, multimedia viewing systems, etc.). Within the described context, the network 336 is representative of an Internet or intranet, or a local or wide area network. However, the network 336 may be implemented in many different forms, including both wire-based networks (e.g., cable, telephone, fiber optic, etc.) and wireless networks (e.g., RF, satellite, microwave, etc.).

Figure 1:
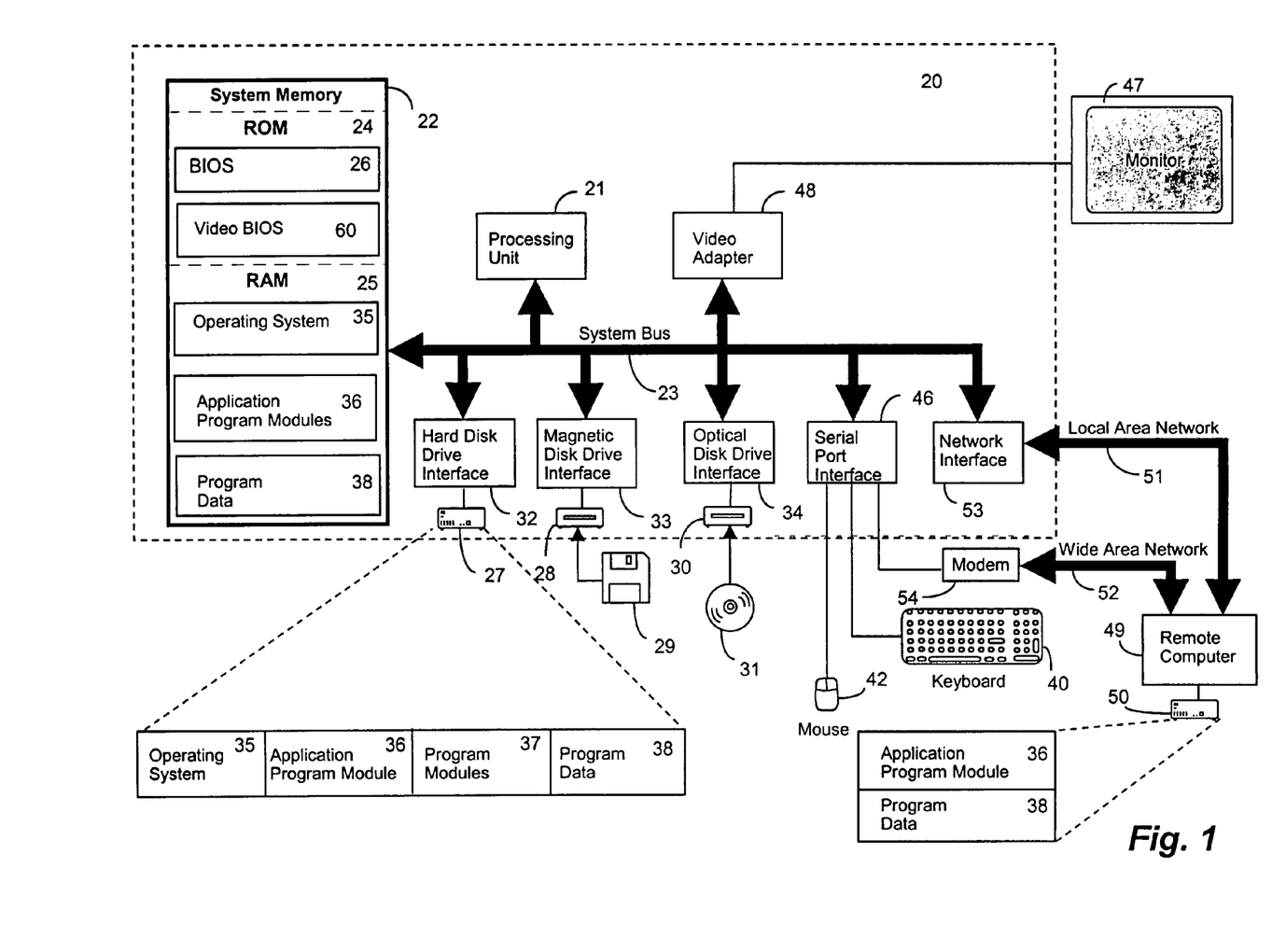
FIG. 1 is a block diagram of an exemplary personal computer.

FIG. 1 and the following discussion are intended to provide a brief, general description of an exemplary customer computer 20. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. A video BIOS 60 is also stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, application program modules 36, such as Microsoft's "OFFICE 10" suite of program modules, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

With reference again to FIG. 2, suppose a customer purchases a software product for running on the computer 20. In this illustration, the software product is in the form of a shrink-wrap product 222 having a software program stored on a transportable computer-readable medium, such as a CD-ROM or floppy diskette. In other implementations, the software product may be delivered electronically over a network. The customer loads the software product onto the computer 20 as a program 36 stored in system memory 22.

During installation, the customer is prompted to enter a portion of the product ID of the software product. The product ID (PID) in this case is partially derived from the CD key 224 printed on the label of the shrink-wrap package. The customer enters the CD key 224, which is associated with the program 36. Additionally, another portion of the product ID is already included in the software program 36 and the software product combines the portion with the CD key into a product ID that is unique to the specific installation.

As part of the installation process, the customer registers the software product with the activation authority. This authority might be, for example, the product manufacturer or an authorized third party. The activation process allows the customer to activate the software product for installation and use on a specific computer.

Figure 3:
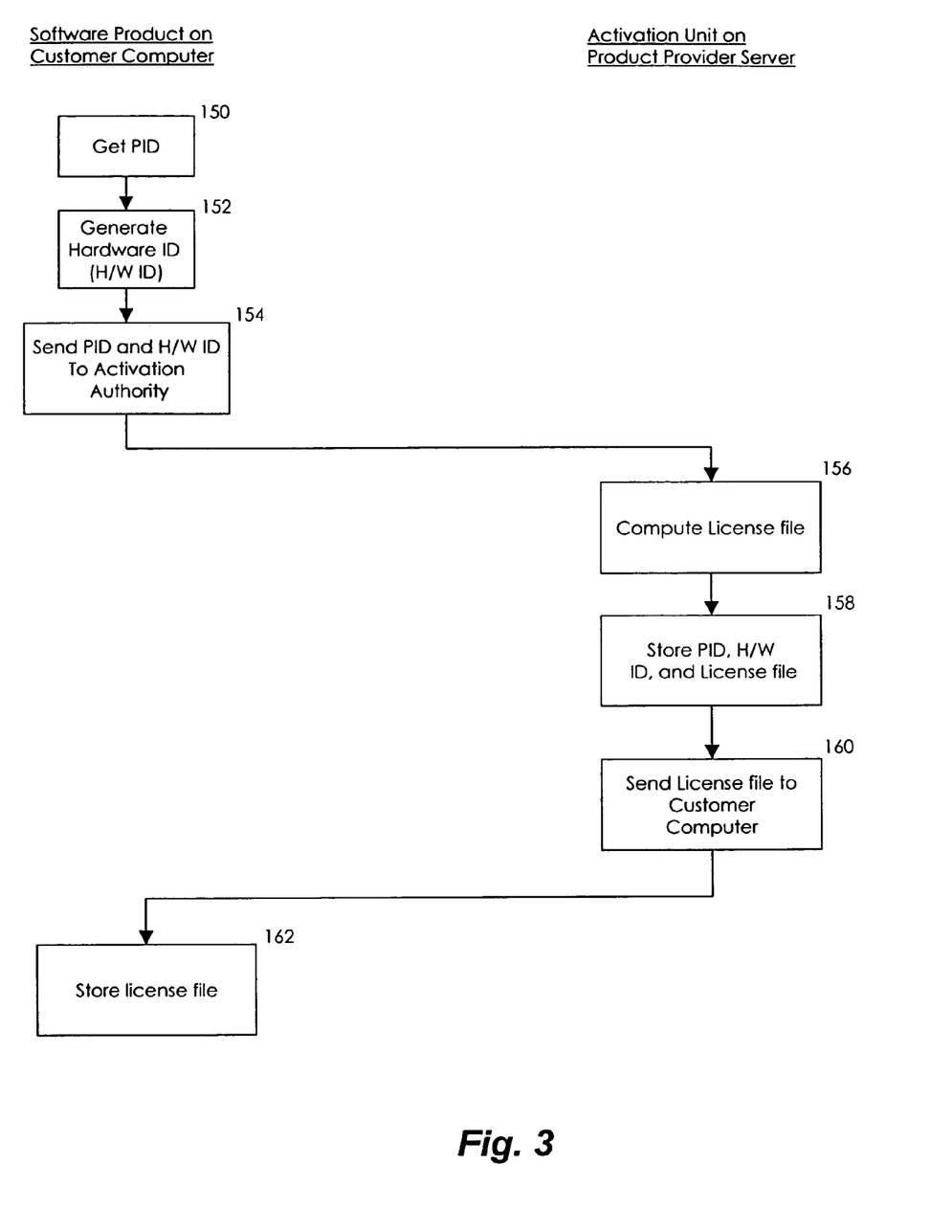
FIG. 3 is a flow diagram showing steps in a method for activating the software product for use on the computer.

FIG. 3 shows steps in a method for activating the software product 36 for installation and use on the computer 20. The method is described with continuing reference to FIG. 2. The steps are performed in software by the software product on the customer computer, and by an activation unit 110 on the activation server. At step 150, the software product 36 obtains its product ID 102. As an example, the product ID consists of a 5-digit RPC (registered product code) value for the software product, a 3-digit site value indicating a place of manufacture, and a 7-digit serialized number that is incremented with each product.

The software product 36 generates a hardware ID (H/W ID) that identifies a set of hardware components that make up the customer's computer 20 (step 152). The hardware ID may be a multi-digit value having at least one digit representing each of the corresponding system components. As an example, the software product generates a 5-digit hardware ID that includes a single digit for each of five system components: BIOS 26, VBIOS 60, RAM 25, hard disk drive 27, and floppy disk drive 28. A digit for a given system component can be derived in different ways, such as performing a modulo operation on a chunk of the BIOS, or on the hard disk drive's serial number. Table 1 shows an example construction of a 5-digit hardware ID, and how the digits are derived from the corresponding component.

TABLE 1

| Digit Place | Hardware Component | Method |
|---|---|---|
| 1 | BIOS | Perform modulus 8 on first 2K chunk of BIOS. |
| 2 | Hard Disk Drive | Perform modulus 8 on 64-bit HDD serial number. |
| 3 | RAM | Perform modulus 9 of total bytes of RAM. |
| 4 | Floppy disk drive | Perform modulus 9 on FDD configuration return value. |
| 5 | Video Card | Perform modulus 9 on Video BIOS. |

It is noted that other hardware components may be used. For instance, many computers are equipped with a network card with a unique 48-bit address. A digit for the hardware ID can be derived from this global network card address. Moreover, more than, or fewer than, five system components may be used to derive the hardware ID.

The software product in this example concatenates the 15-digit product ID with the 5-digit hardware ID, and sends the 20-digit value over the network 336 to the activation server 334 (step 154 in FIG. 3). This phase is preferably automated in that the software product automatically initiates connection with the activation server 334 to register itself with the activation authority.

Alternatively, the software product supports an activation pilot with a graphical user interface (UI) dialog window asking the customer to call a service representative at the activation authority. The UI window lists the product ID and the hardware ID, and includes an entry box to enter the license file given by the service representative over the phone.

The activation server 334 has an activation unit 110 to assign a license file to the software product on the customer's computer. The activation unit 110 computes the license file from the product ID and the hardware ID (step 156 in FIG. 3). In the illustrated implementation, the activation unit 110 employs a hashing algorithm 112 to compute a hash value of the concatenated product ID and hardware ID. The activation server 334 also maintains a database 114 to store the product ID, hardware ID, and license file (step 158 in FIG. 3). Preferably, these IDs are correlated in a table or other data record 116.

The activation server 334 returns the license file over the network 336 to the customer computer 20 (step 160 in FIG. 3). In the manual case, the service representative tells the customer the license file over the phone and the customer enters the license file via the UI window. The license file 118 is stored locally in the system memory 22 of the customer computer 20, where it is accessible by the software program 36 (step 162 in FIG. 3). The program 36 is also equipped with the same hashing algorithm 112 as found in the activation unit 110 at the activation server 334.

Figure 4:
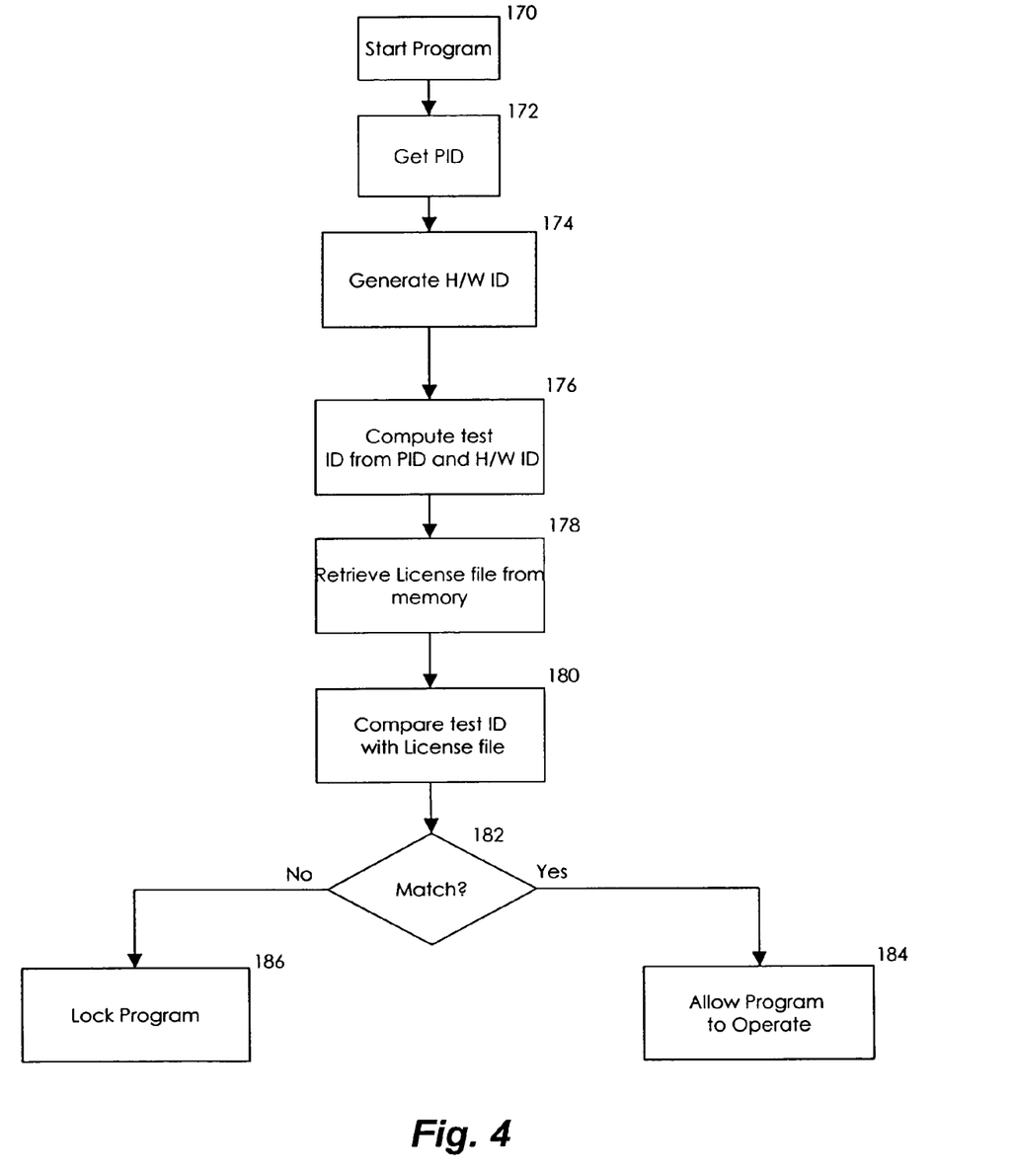
FIG. 4 is a flow diagram showing steps in a method for running the software product on the computer.

FIG. 4 shows steps in a method for running the software product 36 on the computer 20. The method is described with continuing reference to FIG. 2. The steps are performed by software code within the software product on the customer computer. At step 170, the software product is started. On each launch after installation, the software product obtains the product ID 102 (step 172) and generates the hardware ID from the set of hardware components within the computer (step 174).

At step 176, the software product 36 computes its own test ID from the product ID and hardware ID using the hashing algorithm 112. This is the same hashing algorithm as employed by the activation unit 110 when computing the original license file 118. The software product 36 retrieves the original license file 118 from memory 22 (step 178 in FIG. 4) and compares the test ID to the license file 118 (step 180 in FIG. 4). If the two match (i.e., the "yes" branch from step 182), the software product is enabled to operate on the computer (step 184). On the other hand, if no match occurs (i.e., the "no" branch from step 182), the software product is locked and prevented from operating on the computer (step 186 in FIG. 4).

The anti-piracy system is effective at stopping repeated installation of the same software product on multiple different machines. In the typical case, the test and license files will not match if the hardware ID is different now than it was when the customer first registered the software product with the activation authority. That is, the only thing that has changed in the computation of the test and license files is the hardware ID. The product ID and the hash algorithm are the same for both computations.

A different hardware ID suggests that the underlying hardware components have been altered in some manner. For instance, reconfiguring the floppy disk drive or replacing the hard disk drive might change the hardware ID. Of course, an entirely different computer with a different set of hardware components might also result in a different hardware ID.

If an unscrupulous customer attempts to install the product on another computer, the software product will determine that the test and license files do not match and will self-lock, thereby preventing its operation on the different computer. The customer is then forced to contact the activation authority to obtain a new license file, and if appropriate, pay an additional licensing fee for an additional installation.

Another advantage is that the anti-piracy system is sensitive to the situation in which the customer has upgraded his/her computer, without effectively creating a new machine, and is now attempting to reinstall the software product on the upgraded computer. In this situation, the software product determines whether a new set of hardware components in the computer is substantially different from the original set of hardware components. If only one or a few components are different, the upgraded computer is more like the original computer and the software product is permitted to operate. Conversely, if many or all components are different, the "upgraded" computer more closely resembles a new computer and the software product is prevented from operating on this new computer.

One way the software product makes this determination is by trying different permutations of the hardware ID, changing at least one digit per try while leaving other digits unchanged. Each modified hardware ID is concatenated with the product ID, and then hashed to produce the test ID. If this trial-and-error process yields a match between the test and original license files, the software product is assured that only one or a few components have been altered, and the software product is permitted to run.

Figure 5:
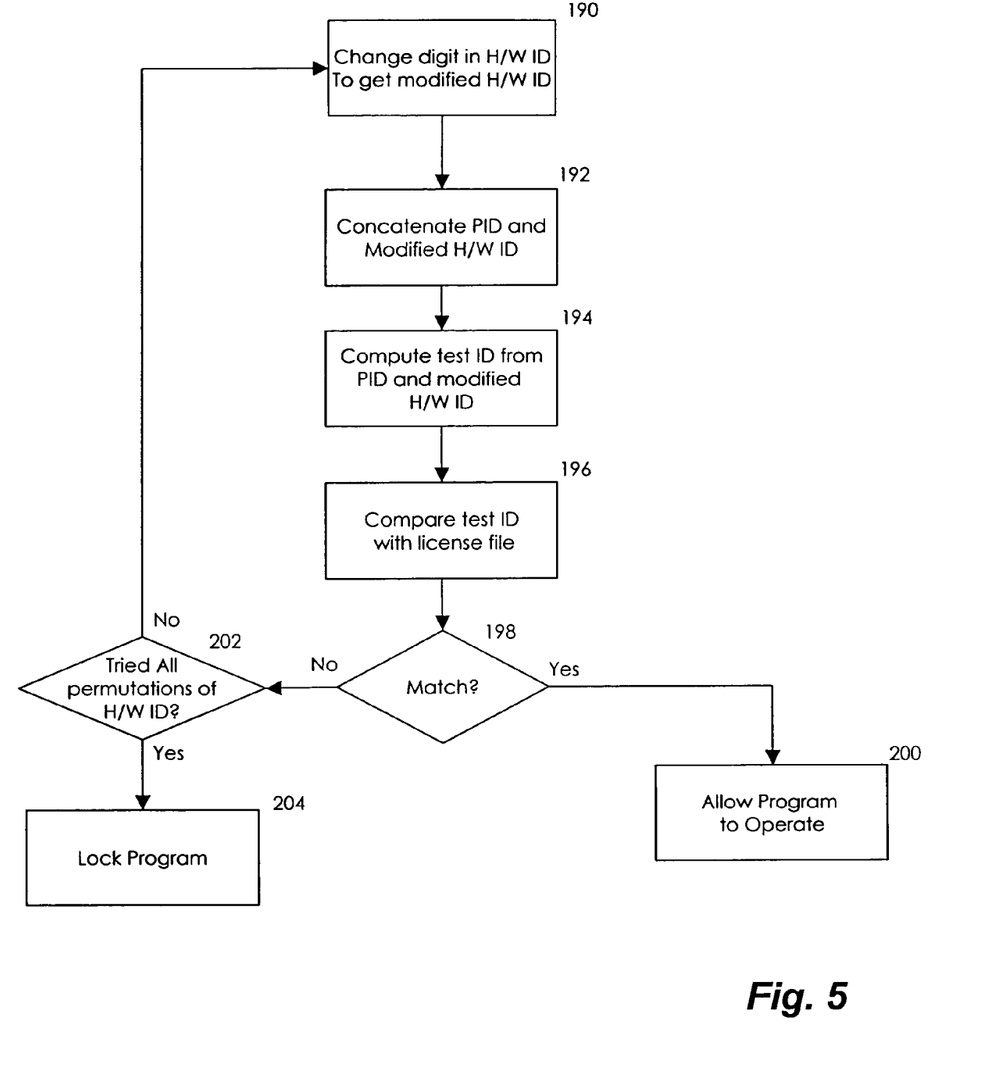
FIG. 5 is a flow diagram showing steps in a method for running the software product after the computer has been upgraded.

FIG. 5 shows steps in a method for running the software product 36 on the computer 20 after upgrade. The method is described with continuing reference to FIG. 2. The steps are performed by software code within the software product on the customer computer. At step 190, the software product changes at least one digit in the hardware ID, while leaving the other digits unchanged, to produce a modified hardware ID. For example, the software ID might toggle one digit in the 5-digit hardware ID, while maintaining the other four digits the same.

The software product concatenates the product ID and modified hardware ID (step 192) and computes a new test ID using the hashing algorithm 112 (step 194). At step 196, the software product retrieves the license file 118 from memory 22 and compares it to the test ID. If the two match (i.e., the "yes" branch from step 198), this suggests that that only one component has been changed or upgraded, but rest of the computer remains substantially the same. Thus, the computer is deemed an upgrade, and not a new computer. The software product is enabled to operate on the computer (step 200 in FIG. 5).

If no match occurs (i.e., the "no" branch from step 198), the software product remains locked. At step 202, the software product checks whether it has exhausted all possible new combinations of digits. As an example, suppose the software manufacturer wants to draw a distinction between a computer with one or two new hardware components (which the manufacturer deems an "upgrade"), and a computer with three or more new hardware components (which the manufacturer deems a new computer and not an "upgrade"). In this case, the software product is configured to change at most up to two digits within the five-digit hardware ID while keeping at least three digits the same. This process essentially determines whether at most two out of the five hardware components are different. If the software product has not exhausted all available permutations of the hardware ID (i.e., the "no" branch from step 202), the software product repeats steps 190-198 for the next modified hardware ID.

When the software product exhausts all available permutations without success, this tends to indicate that the computer is a new computer, not an upgrade. Accordingly, the software product remains locked (step 204) and forces the customer to contact the activation authority for assistance.

The anti-piracy system is advantageous in that it allows the customer some flexibility to upgrade or modify his/her computer without locking out the program. It is noted, however, that this method can be circumvented through incremental upgrades, where a customer changes out one component at a time and reinstalls the software product after each component upgrade. However, the incremental upgrade approach is most likely not a viable option for the customer because it requires a large amount of time to eventually create the new computer.

A variation of the anti-piracy method prevents even the incremental upgrade approach, but at the cost of requiring the customer to contact the activation authority any time the test ID and the license file fail to match. When a mismatch occurs, the software product initiates a connection with the activation server 334 and sends the product ID and hardware ID over the network 336. The activation unit 110 checks the database 114 for any prior records involving the product ID. If records with the same product ID exist, the activation unit 110 evaluates the hardware IDs associated with the product IDs to determine how they have changed. For instance, if the two hardware IDs differ in one or two digits (which is an acceptable indication of upgrade), the activation unit will compute a new license file, return it to customer computer, and create a new record in the database 116. This can be the case even if there are multiple entries in the database for a single product ID. For instance, further analysis might reveal that the hardware ID has remained substantially the same, excepting one or two digits, in each table entry for the product ID.

On the other hand, suppose the activation unit determines that any two hardware IDs for the same product ID differ by more than two of the five digits. This case indicates that the computer, albeit incrementally upgraded, has become effectively a new computer. In this case, the activation unit returns a message denying a new license file and explaining that a new license is required before the product can be reinstalled and run on the new computer. In this manner, the customer cannot incrementally upgrade all products in the computer (one at a time) to effectively produce a new computer without payment of a new license fee.

Expanded Hardware ID

In another embodiment, the invention comprises an expanded hardware ID (H/W ID) that is not 5 digits, but instead is 64 bits. The 64 bit hardware ID represents ten different components of the user's computer: the CD-ROM device 30, the disk adapter 32, the disk device 27, the display adapter 48, the first drive (27) serial number, the network interface (53) MAC address, the processor (21) serial number, the processor (21) type, the RAM (25) size in Mb, and the SCSI adapter (32 or 34).

The 64 bits in the expanded H/W ID are divided between the ten different components depending on the ability to differentiate between computers based on the components. For example, if there are only two possible CD-ROM devices available in the marketplace, the CD-ROM portion of the H/W ID would be represented by fewer bits than if there were thousands of different CD-ROM devices available. Thus, the number of bits corresponding to a component typically corresponds roughly to the ability to differentiate computers based on that particular component.

The CD-ROM device portion of the H/W ID is typically the manufacturer's ID of the CD-ROM device. The CD-ROM portion corresponds to a hash of the CD-ROM device identification string.

The disk adapter portion of the H/W ID is the hard disk drive interface 32 connecting the hard disk 27 to the system bus 23. It corresponds to a hash of the disk adapter peripheral component interface (PCI) vendor and device IDs.

The disk device portion of the H/W ID is the hard disk drive 27. It corresponds to a hash of the disk device identification string.

The display adapter portion of the H/W ID identifies the device that converts information in memory to video output to a display, such as video adapter 48. It corresponds to a hash of the video adapter PCI vendor and device Ids.

The first drive serial number portion of the H/W ID identifies the hard disk drive 27 of the user's computer by a hash of the operating system assigned serial number of the first partition on that drive.

The Media Access Control (MAC) address is a hardware address of a network interface 53 connecting the computer to a shared network.

The processor serial number portion of the H/W ID identifies the manufacturer's serial number of the processing unit 21.

The processor type portion of the H/W ID identifies the type of processing unit 21. It corresponds to a hash of the CPU manufacturer, family ID and model number.

The RAM portion of the H/W ID identifies the size of RAM 25 in megabytes.

The SCSI adapter portion of the H/W ID identifies the Small Computer Systems Interface adapter (32 or 34 for example) of the user's computer.

The expanded H/W ID is created at installation of the software product 36 and may be stored on the user's computer by itself or as part of a license file stored on the user's computer. The license file is a file containing information that has been digitally signed by the activation authority. The expanded H/W ID is created using the first instance of each component encountered during the installation process. For example, if a user's computer has several CD-ROM devices, then the first CD-ROM device encountered during installation is used to complete the CD-ROM device portion of the expanded H/W ID.

When the software product is started, the expanded H/W ID is compared to the user's computer to determine whether the expanded H/W ID and the hardware components match. This comparison method is described in reference to FIG. 6.

Version Number

The expanded H/W ID may also include a version number bit(s). The version number bit is used to indicate what the version number of the software product was when the expanded H/W ID was created. As technological advancements in hardware occur over time, it may be necessary to remove certain portions of the expanded H/W ID from consideration during updates to the software product. The version number will help identify at what point in time an expanded H/W ID was created and whether or not it needs to be changed to reflect technological hardware advancements.

Dockable Flag

The expanded H/W ID may also include a dockable flag. The dockable flag indicates whether the user's computer is capable of being docked, as is the case with portable computers. If a computer is capable of being docked and is docked at the time the expanded H/W ID is generated, then it is possible that elements of the docking station could be incorporated into the expanded H/W ID. Thus, the dockable flag is set for portable computers, and, if the dockable flag is set when the expanded H/W ID is examined, then several portions of the expanded H/W ID (disk adapter, display adapter, and SCSI adapter) are not compared to the user's computer when determining whether to allow the software product to fully operate.

Comparing Expanded Hardware ID with a Computer

Figure 6:
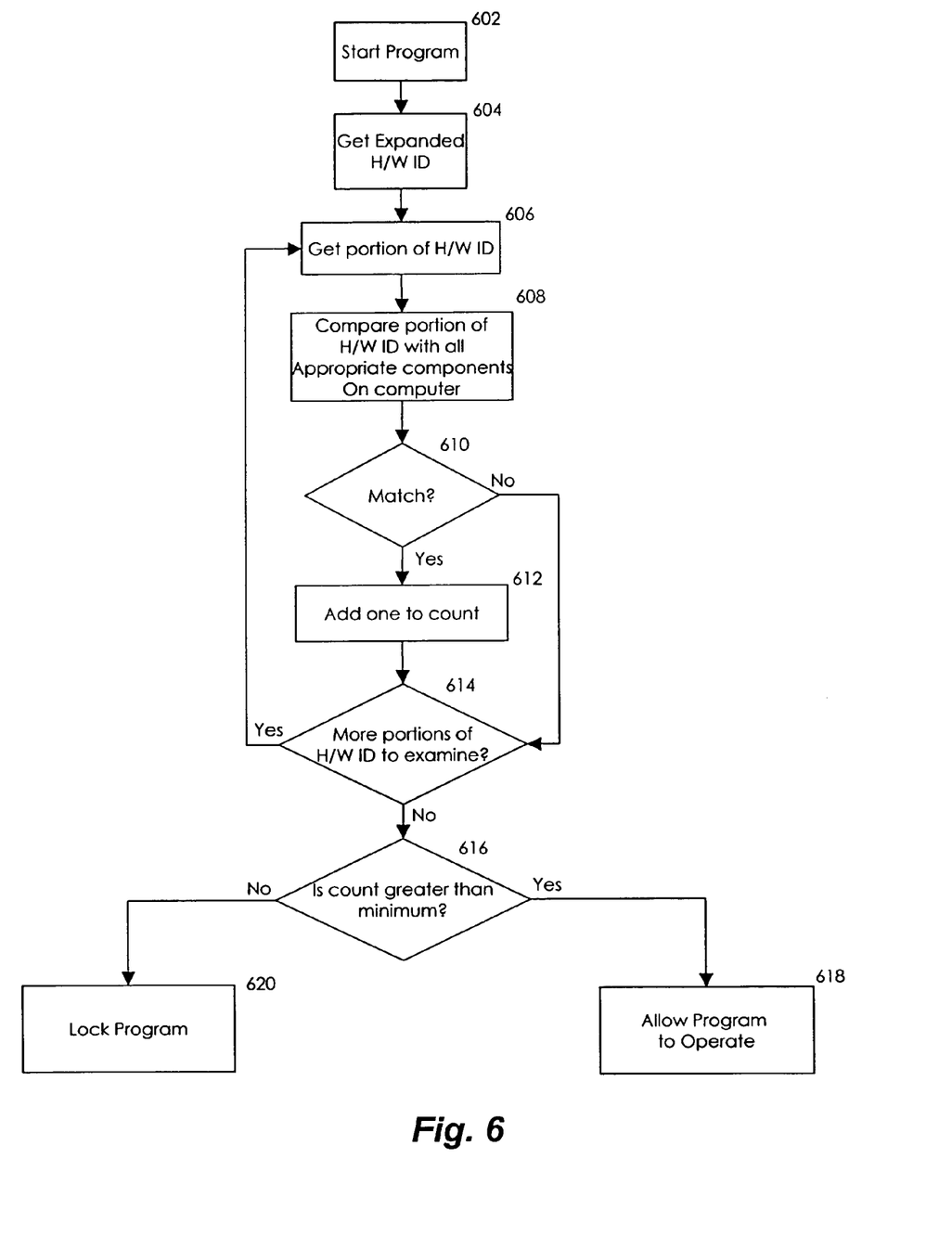
FIG. 6 is a flow diagram showing steps in a method for running the software product with an expanded hardware ID.

FIG. 6 is a flow diagram illustrating a method 600 for comparing the expanded H/W ID to the user's computer when the software product is started.

Generally described, if seven out of ten of the components in the expanded H/W ID are found in the computer, then the computer matches the expanded hardware ID and the software product is allowed to fully operate. The expanded hardware ID is oftentimes useful because when matching the expanded hardware ID to the machine, the process iterates through the components of the computer to determine if any of the computer's components match the expanded hardware ID. For example, if the computer's main disk drive does not match the expanded hardware ID, then the process will iterate through all of the computer's disk drives to determine if another one matches the expanded hardware ID.

FIG. 6 shows steps in a method for running the software product 36 with an expanded hardware ID on the computer 20. The steps are performed by software code within the software product on the customer computer. At step 602, the software product is started. On each launch after installation, at step 604, the software product obtains the expanded hardware ID which is stored on the computer 20. Alternatively, the expanded H/W ID may be stored as part of the digitally signed license file and extracted from the digitally signed license file at step 604.

A portion of the expanded H/W ID is obtained at step 606. As described above, the expanded H/W ID is typically 64 bits with portions of the bits corresponding to different hardware components of the users computer, such as: the CD-ROM device 30, the disk adapter 32, the disk device 27, the display adapter 48, the first drive (27) serial number, the network interface (53) MAC address, the processor (21) serial number, the processor (21) type, the RAM (25) size in Mb, and the SCSI adapter (32 or 34). At step 606, a portion corresponding to one of the hardware components is retrieved from the expanded hardware ID. For example, the bits corresponding to the CD-ROM device may be retrieved at step 606.

At step 608, the bits retrieved from the expanded H/W ID at step 606 are compared to all the appropriate hardware components of the user's computer 20. For example, all of the CD-ROM devices on the user's computer may be examined to determine whether there is a match with the bits from the expanded H/W ID corresponding to the CD-ROM device.

At step 610, it is determined whether there is a match. If not, then step 614 is performed. However, if there is a match between the expanded H/W ID portion and a hardware component on the user's machine, then one is added to a count (step 612). The count is used to determine how closely the user's computer matches the expanded H/W ID.

At step 614, it is determined whether there is another portion of the expanded H/W ID that has not been examined. If so, the method returns to step 606 and another portion of the expanded H/W ID is examined. However, if all portions of the expanded H/W ID have been examined and compared to the hardware on the user's computer, then it is determined whether the count is greater than a minimum number established by the software product manufacturer (step 616). Typically, the minimum will be six (unless the dockable flag is set in which case the minimum will be four). So, if seven components of the expanded H/W ID are found on the user's computer then the count will be seven and the program will fully operate (618). However, if the count does not exceed the minimum, then the program will be locked (step 620) or the program will operate in a reduced functionality mode.

In other words, if the count is greater than the predetermined minimum, the software product is enabled to fully operate on the computer (step 618). On the other hand, if the count is not greater than the predetermined minimum (i.e., the "no" branch from step 616), the software product is locked and prevented from operating on the computer (step 620 in FIG. 6). It should be noted that, alternatively, the software product may be allowed to operate in a "reduced functionality mode" where key features are limited or unavailable rather than preventing the software product from working entirely.

If an unscrupulous customer attempts to install the software product on another computer, the software product will determine that the expanded H/W ID does not match the actual hardware on the computer and will self-lock, thereby preventing its operation on the different computer. The customer is then forced to contact the activation authority and, if appropriate, pay an additional licensing fee for an additional installation.

Another advantage is that the anti-piracy system is sensitive to the situation in which the customer has upgraded his/her computer by adding components (without removing components) and is now attempting to reinstall the software product on the upgraded computer. In this situation, the expanded H/W ID will still find the older components on the user's computer and will allow the software product to operate. In other words, the expanded H/W ID eliminates the problem encountered when a user added a new component and only the first instance of a component was considered. In this case, a non-expanded H/W ID would sometimes find a mismatch because the new component may have been the first instance detected and would not match the non-expanded H/W ID. The expanded H/W ID eliminates this problem and accommodates new components.

It should be understood that the expanded H/W ID allows for distinguishing between two different computers, while still allowing a user to add new hardware to his computer that was not previously present. In a preferred embodiment, the expanded H/W ID allows 3 out of 10 hardware components to be removed before disabling the software product.

In a preferred embodiment, the expanded H/W ID also allows a user to have many different components, such as 3 video drivers, 10 hard disks, etc. without disabling the software product so long as the no more than three of the original components found in the expanded H/W ID have not been removed. In other words, the expanded H/W ID is tolerant of adding new components, so long as no more than three of the original components found in the H/W ID are removed.

It should be understood that the process of matching the expanded H/W ID to the user's computer is an iterative process performed on a component-by-component basis. Thus, it should be understood that the present invention compares all of the relevant components on the user's computer with the expanded H/W ID to determine whether the expanded H/W ID and the computer match.

It should be understood that the foregoing pertains only to the preferred embodiments of the present invention, and that numerous changes may be made to the embodiments described herein without departing from the spirit and scope of the invention.

We claim:

1. A computer-readable storage medium including computer executable instructions executed by a processor on a computer, the instructions comprising: generating a single computer system identifier (ID) for identifying a computer system, the single computer system ID being comprised of a concatenation of a plurality of hardware device identifier portions, the computer system comprising a plurality of components, each component having a unique identifier, wherein the single computer-system ID is stored on the computer system after being generated during the installation of a software product on the computer system, wherein the single computer system ID comprises the concatenation of the plurality of hardware device identifier portions during the installation of the software product on the computer system, each hardware device identifier portion associated with a single component of the computer system wherein the single computer system ID represents the computer system plurality of components and wherein the single computer system ID comprises a variable number of bits; wherein the single computer system ID differentiates the computer system from other computer systems based on a particular component having a unique identifier, wherein the particular component is one of the plurality of components; and wherein the plurality of hardware device identifier portions identifying a plurality of hardware devices comprises all members of a group comprising a CD-ROM device portion identifying a CD-ROM device of the computer system; a disk adapter portion identifying a disk adapter of the computer system; a disk device portion identifying a disk device of the computer system; a display adapter portion identifying a display adapter of the computer system; a first drive serial portion identifying a disk drive of the computer system; a MAC address portion identifying a MAC address of the computer system; a processor serial number portion identifying a processor serial number of the computer system; a processor type portion identifying a processor type of the computer system; a RAM size portion identifying a RAM size of the computer system; and a SCSI adapter portion identifying a SCSI adapter of the computer system.

2. The single computer system ID of claim 1 wherein the CD-ROM device portion comprises a hashing of a CD-ROM device identification string.

3. The single computer system ID of claim 1 wherein the disk adapter portion comprises a hashing of disk adapter peripheral component interface (PCI) vendor and device identifications.

4. The single computer system ID of claim 1 wherein the disk device portion comprises a hashing of a disk device identification string.

5. The single computer system ID of claim 1 wherein the display adapter portion comprises a hashing of video adapter PCI vendor and device identifications.

6. The single computer system ID of claim 1 wherein the first drive serial portion comprises a hashing of an operating system assigned serial number of a first partition.

7. The single computer system ID of claim 1 wherein the MAC address portion comprises a hardware address of a network interface connecting the computer system to a shared network.

8. The single computer system ID of claim 1 wherein the processor serial number portion comprises an identification of the manufacturer's serial number for the processor of the computer system.

9. The single computer system ID of claim 1 wherein the RAM size portion comprises the size of the RAM in the computer system in megabytes.

10. The single computer system ID of claim 1 wherein the SCSI adapter portion comprises an identification of the Small Computer Systems Interface (SCSI) adapter of the computer system.

* * * * *